(12) United States Patent
Venzal et al.

(10) Patent No.: US 11,720,830 B2
(45) Date of Patent: Aug. 8, 2023

(54) METHOD, DEVICE AND SYSTEM FOR AUTHORIZING ACCESS TO A SHARED VEHICLE

(71) Applicant: Continental Automotive GmbH, Hannover (DE)

(72) Inventors: Bertrand Venzal, Toulouse (FR); Benjamin Dalbies, Toulouse (FR); Rania Ben Kahla, Toulouse (FR)

(73) Assignee: Continental Automotive GmbH

( * ) Notice: Subject to any disclaimer, the term of this patent is extended or adjusted under 35 U.S.C. 154(b) by 0 days.

(21) Appl. No.: 17/889,840

(22) Filed: Aug. 17, 2022

(65) Prior Publication Data
US 2023/0059362 A1 Feb. 23, 2023

(30) Foreign Application Priority Data
Aug. 18, 2021 (FR) ...................... 2108747

(51) Int. Cl.
*G06F 1/00* (2006.01)
*G06Q 10/02* (2012.01)
*B60R 25/24* (2013.01)

(52) U.S. Cl.
CPC ............. *G06Q 10/02* (2013.01); *B60R 25/24* (2013.01)

(58) Field of Classification Search
None
See application file for complete search history.

(56) References Cited

U.S. PATENT DOCUMENTS 2,842,851 A * 7/1958 Dexter, Jr. ............... G01B 7/06
324/230
4,486,834 A * 12/1984 Kobayashi .......... G06F 11/2082
714/E11.159

(Continued)

FOREIGN PATENT DOCUMENTS

EP 1398719 A1 3/2004

OTHER PUBLICATIONS

French Search Report and Written Opinion for French Application No. 2108747, dated Apr. 13, 2022, with translation, 15 pages.

(Continued)

*Primary Examiner* — Tonya Joseph
(74) *Attorney, Agent, or Firm* — RatnerPrestia

(57) ABSTRACT

A method for managing authorization to access a shared vehicle, the vehicle having a memory dimensioned to simultaneously store a maximum number of reservations. The method includes obtaining a first reservation of a vehicle, searching, in a local representation of the memory of the vehicle, for an available location for storing the first reservation, and when there is no available location for storing the first reservation, selecting, from the reservations stored in the local representation of the vehicle's memory, a second reservation such that the start date of the second reservation is after the start date of the first reservation, storing the characteristics of the second reservation in a waiting list, replacing, in the local representation of the memory of the vehicle, the selected reservation with the first reservation, and transmitting, to the vehicle, a command to delete the second reservation, and a command to add the first reservation.

6 Claims, 4 Drawing Sheets

(56) References Cited

U.S. PATENT DOCUMENTS

| | | | |
|---|---|---|---|
| 5,910,854 A * | 6/1999 | Varaprasad | B32B 17/10036 |
| | | | 359/273 |
| 6,898,685 B2 * | 5/2005 | Meiri | G06F 3/0635 |
| | | | 711/111 |
| 7,624,229 B1 * | 11/2009 | Longinov | G06F 12/0806 |
| | | | 711/206 |
| 2004/0176969 A1 | 9/2004 | Fujinuma | |
| 2006/0018330 A1 * | 1/2006 | Choubal | G06F 13/1605 |
| | | | 370/411 |
| 2006/0072756 A1 | 4/2006 | Leimgruber et al. | |
| 2012/0054579 A1 * | 3/2012 | Oikonomakos | H03M 13/6566 |
| | | | 714/760 |
| 2013/0111203 A1 * | 5/2013 | Baltes | H04L 9/3247 |
| | | | 713/100 |
| 2014/0059280 A1 * | 2/2014 | Im | G06F 12/00 |
| | | | 711/147 |
| 2016/0098870 A1 * | 4/2016 | Bergerhoff | H04W 4/48 |
| | | | 340/5.61 |
| 2017/0134382 A1 * | 5/2017 | Darnell | H04W 4/029 |
| 2018/0074980 A1 * | 3/2018 | Kawahara | G06F 13/1689 |
| 2018/0262336 A1 | 9/2018 | Fujiwara et al. | |
| 2018/0351746 A1 | 12/2018 | Yoon et al. | |
| 2019/0087752 A1 | 3/2019 | Kaufer et al. | |

OTHER PUBLICATIONS

French Search Report and Written Opinion for French Application No. 2108747, dated Apr. 13, 2022, with partial English translation, 9 pages.

* cited by examiner

METHOD, DEVICE AND SYSTEM FOR AUTHORIZING ACCESS TO A SHARED VEHICLE

CROSS REFERENCE TO RELATED APPLICATIONS

This application claims priority to French Patent Application No. 2108747, filed Aug. 18, 2021, the contents of such applications being incorporated by reference herein.

FIELD OF THE INVENTION

The invention belongs to the field of control of access to a vehicle, and in particular relates to a method for distributing virtual keys for accessing a shared vehicle.

BACKGROUND OF THE INVENTION

For decades the problem of control of access to a vehicle has been solved through one or more physical keys held by the owner of the vehicle. With the development of on-board electronics, conventional keys have gradually been replaced by electronic devices endowed with the ability to communicate wirelessly, allowing a vehicle to be accessed and started contactlessly.

Such systems of keys are however unsuitable when it is a question of sharing a vehicle between a number of users, and especially when fleets of vehicles are placed at the disposal of a high number of users. Specifically, the use of such physical keys implies steps of picking up and returning the keys, resulting in additional costs and a lack of flexibility (restricted opening times, need for personnel to hand over and collect keys, etc.).

The deployment of cellular communication networks and the integration of on-board communication devices into vehicles have allowed the situation to be improved by enabling new methods for controlling access.

Thus, techniques consisting in transmitting, to a vehicle, one or more access authorizations via a wireless connection are known. Such an authorization to access a vehicle is associated with one particular user to which an identification device such as an NFC tag is provided. Alternatively, a mobile terminal of the user may have been provided with a particular identifier. When the user wishes to access a vehicle, the identifier comprised in his tag or his mobile terminal is transmitted to a communication unit of the vehicle, for example via a Bluetooth or NFC connection, in order that the vehicle may verify that the user indeed is authorized to access the vehicle in a particular time range. At the end of the period of use granted to the user, the authorization is revoked.

Such techniques clearly improve the situation, in particular by allowing a user to borrow and return a vehicle at any time.

However, the limits of such a system become conspicuous when the vehicle is parked in a location without network coverage, in an underground parking lot for example. Under these conditions, the vehicle can no longer receive new access authorizations. For example, a self-service scooter left by its last user in a region without coverage after use will no longer be able to be reserved.

In order to overcome this drawback, it has been proposed to transmit access authorizations to a vehicle indirectly, via the mobile terminal of a user who wishes to use it. To this end, an on-line server is provided with a reservation calendar for each vehicle of the fleet that it is tasked with supervising.

When a user wishes to reserve a vehicle, he transmits a request to the server. The server then generates an authorization if the vehicle is available in the desired time range. If the vehicle is uncontactable, all the pending authorizations for the vehicle are transmitted to the mobile terminal of the user. In this way, when the user wishes to access the vehicle, the authorizations stored in his mobile terminal are transmitted to the vehicle in order that it may or may not authorize access.

In this way, it is possible to reserve and to access a vehicle even when the latter is unavailable. Nevertheless, for reasons of cost, the memory locations allowing future reservations and authorizations to be stored in a vehicle are limited. A problem therefore arises when a user attempts to access a vehicle having no network coverage and the memory of the vehicle already contains a maximum number of reservations: although the user might have reserved the vehicle, he will not be able to access it because the vehicle is unable to load the corresponding authorization.

There is therefore a need for a technique that will allow the situation to be improved.

SUMMARY OF THE INVENTION

To this end, a method is provided for managing authorization to access a shared vehicle, the vehicle being provided with a memory dimensioned to simultaneously store a maximum number of reservations, the method comprising the following steps, which are implemented on reception by a server of a request to reserve the vehicle, the server comprising a local representation of the memory of the vehicle:
  obtaining a first reservation of the vehicle, a reservation being associated with at least a reservation start date, a reservation end date and with an identifier of a mobile terminal to be used to access the vehicle,
  when the number of reservations stored in the local representation of the memory of the vehicle reaches the maximum number of reservations that it is possible to simultaneously store in the memory of the vehicle:
    selecting, from the reservations stored in the local representation of the memory of the vehicle, a second reservation such that the start date of the second reservation is after the start date of the first reservation,
    replacing, in the local representation of the memory of the vehicle, the second reservation with the first reservation, and
    transmitting, to the vehicle, a memory synchronization command comprising at least:
      a command to delete the second reservation, and
      a command to add the first reservation.

The reservation server manipulates an image of the memory of the vehicle. This image of the memory of the vehicle is synchronized with the physical memory of the vehicle via the transmission to the vehicle of commands to add and to delete reservations. In this way, the responsiveness of the reservation system is improved, the memory of the vehicle being updated asynchronously. Furthermore, the de-prioritization of a subsequent reservation to the benefit of a new reservation the start date of which is earlier makes it possible to avoid being constrained by the number of memory locations physically available in the vehicle. The responsiveness of the reservation system is thus improved.

According to one particular embodiment, the method is such that transmitting the commands to add the first reservation and to delete the second reservation comprises a substep of transmitting said commands to at least one mobile terminal the identifier of which is associated with a reservation stored in the memory associated with the vehicle, the mobile terminal being configured to retransmit said commands via a short-range wireless connection during handover of the vehicle.

In this way, access authorizations may be communicated to a vehicle even when the latter is parked in a region without coverage. For example, when a vehicle is returned to an underground parking lot out of range of a cellular network, the memory of the vehicle may be updated with new reservations when a user takes possession of the vehicle. In other words, the mobile terminal used to unlock the vehicle is used to update the reservations in the memory of the vehicle asynchronously.

In one particular embodiment, the method is such that the characteristics of the second reservation are stored temporarily in the replacing step, and that it further comprises the following steps, when a reservation slot is freed up in the local representation of the memory of the vehicle:
    generating a third reservation comprising the characteristics of the temporarily stored second reservation,
    storing the third reservation in the local representation of the memory of the vehicle, and
    transmitting, to the vehicle, a command to add the third reservation.

When a later reservation is replaced by a more immediate reservation in the memory associated with the vehicle, the characteristics of the deleted reservation are stored in a temporary memory. In this way, the data relative to the replaced reservation may be used to generate a new reservation when a location is freed in the memory, for example following the expiry or cancellation of a reservation.

According to one particular embodiment, a reservation comprises at least:
    a first reservation datum intended for the mobile terminal and comprising a public key of a mobile terminal, a reservation start date and a reservation end date, and
    a second reservation datum intended for the vehicle and comprising a public key of the vehicle, a reservation start date and a reservation end date.

The first reservation datum and the second reservation datum correspond to a virtual key of the mobile terminal authorized to unlock a vehicle and to a second virtual key of the reserved vehicle, respectively. The data allowing access to the vehicle are thus distributed between an access terminal, for example a smart phone of a user, and a reserved vehicle. Thus, a terminal allows access only to a vehicle for which it has a reservation, and a vehicle allows access only to a terminal for which it has a reservation.

According to another aspect, the invention relates to a device for managing authorizations to access a shared vehicle, the vehicle being provided with a memory dimensioned to simultaneously store a maximum number of reservations, the device comprising a local representation of the memory of the vehicle, a processor, and a memory in which are stored instructions configured to implement the following steps, when they are executed by the processor:
    obtaining a first reservation of the vehicle, a reservation being associated with at least a reservation start date, a reservation end date and with an identifier of a mobile terminal to be used to access the vehicle,
    when the number of reservations stored in the local representation of the memory of the vehicle reaches the maximum number of reservations that it is possible to simultaneously store in the memory of the vehicle:
        selecting, from the reservations stored in the local representation of the memory of the vehicle, a second reservation such that the start date of the second reservation is after the start date of the first reservation,
        replacing, in the local representation of the memory of the vehicle, the second reservation with the first reservation, and
        transmitting, to the vehicle, a memory synchronization command comprising at least:
            a command to delete the second reservation, and
            a command to add the first reservation.

An aspect of the invention also relates to a server comprising a managing device such as described above.

According to yet another aspect, the invention relates to a data medium containing computer-program instructions that are configured to implement the steps of a method for managing access authorizations such as described above, when the instructions are executed by a processor.

The data medium may be a non-volatile data medium such as a hard disk, a flash memory or an optical disk, for example.

The data medium may be any entity or device capable of storing instructions. For example, the medium may comprise a storage means, such as a ROM, RAM, PROM, EPROM, a CD ROM or even a magnetic recording means, a hard disk for example.

Furthermore, the data medium may be a transmissible medium such as an electrical or optical signal, which is able to be routed via an electrical or optical cable, by radio or by other means.

Alternatively, the data medium may be an integrated circuit, in which the program is incorporated, the circuit being able to execute or to be used in the execution of the method in question.

The various aforementioned embodiments or features may be added, independently of or in combination with one another, to the steps of the managing method. The servers and devices have at least advantages analogous to those conferred by the method to which they relate.

BRIEF DESCRIPTION OF THE DRAWINGS

Other features and advantages of aspects of the invention will become apparent on reading the description which follows. This description is purely illustrative and should be read with reference to the appended drawings, in which.

DETAILED DESCRIPTION OF THE PREFERRED EMBODIMENTS

Figure 1:
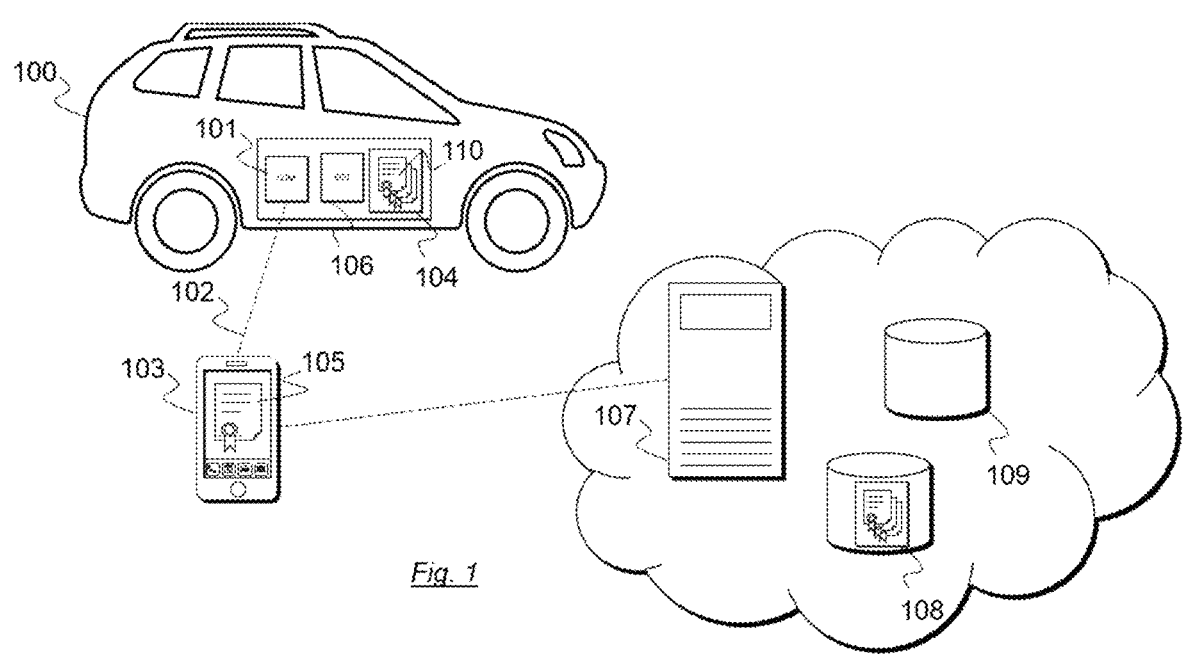
FIG. 1 shows an environment suitable for implementation of the method for managing reservations according to one particular embodiment.

FIG. 1 shows a shared vehicle 100. The vehicle 100 for example forms part of a fleet of vehicles reservable remotely by users.

A user may access the vehicle 100 via a communication terminal 103, such as a smart phone, a smart watch, a tag or a tablet. To do this, the mobile terminal 103 comprises a memory in which is stored a first reservation datum. The first reservation datum is a virtual key 105 of the mobile terminal 103 and allows a reserved vehicle to be accessed from the mobile terminal 103. The virtual key of the mobile terminal comprises at least a public key of the vehicle, a reservation start date and a reservation end date. Optionally, the first reservation datum further comprises rights to access certain functionalities or equipment of the vehicle, such as rights to access the trunk or to use air-conditioning, an entertainment device or a network connection.

During a request to access the vehicle, the terminal 103 transmits its virtual key 105 to the vehicle 100 via a wireless network connection such as a Bluetooth®, Wi-Fi®, NFC and/or 2G, 3G, 4G or 5G cellular network connection.

The vehicle 100 is provided with wireless communication means 101 such as a Bluetooth®, Wi-Fi® or NFC network interface and/or a 2G, 3G, 4G or 5G cellular network interface allowing it to set up a connection 102 with other devices such as the terminal 103, and especially to receive a virtual key 105 from the mobile terminal, which virtual key is transmitted by the terminal 103.

The vehicle 100 further comprises a memory 104, such as a flash memory, a RAM or an EEPROM, configured to store a predefined maximum number of second reservation data for future reservations, 10 reservations for example. A second reservation datum is a virtual key intended for the vehicle. The maximum number of reservations that the vehicle is able to store is for example limited by the amount of physical memory installed.

More precisely, the memory 104 of the vehicle allows virtual keys of the vehicle to be stored with a view to authorizing or not authorizing access to the vehicle. A virtual vehicle key stored in the memory 104 of the vehicle comprises at least a public key of the mobile terminal authorized to unlock the vehicle, a reservation start date, and a reservation end date. Optionally, a virtual key of the vehicle may further comprise authorizations to access one or more pieces of equipment of the vehicle, such as authorizations to access the trunk, air conditioning or a duration and/or a maximum number of uses of a particular functionality, for example a time limit of use or a download limit associated with a network connection.

The vehicle 100 lastly comprises a computer, for example an ECU 106, equipped with a processor and with a memory in which are stored computer-program instructions that are configured to process the requests to access the vehicle and especially to permit or refuse access to the vehicle by evaluating a match between a virtual key of a mobile terminal, which virtual key is transmitted by a terminal 103, and a virtual key of the vehicle, which virtual key is stored in the memory 104, and on the basis of a current date obtained from a clock of the ECU 106. More precisely, since the virtual keys of the vehicle and of the terminal are signed by the server using a private key of the server, the vehicle is able to check the authenticity of the virtual key of the mobile terminal using a public key of the server, which key is delivered to the vehicle beforehand.

FIG. 1 also shows a server 107 of a communication network 108. The server 107 comprises communication means, such as a network interface allowing it to set up connections with other devices, and especially to exchange messages with the mobile terminal 103 and/or with the vehicle 100 via a cellular access network (not shown). More precisely, the network interface allows the server to transmit a first reservation datum, i.e. a virtual key 105, to the mobile terminal 103 and a second reservation datum, such as a virtual key 110, to the vehicle 100. The server further comprises a processor and a memory in which are stored computer-program instructions that, when they are executed by the processor, configure the server to implement the steps of a method for managing access authorizations according to one particular embodiment of the invention.

The server 107 is provided with a database 109 in which is stored a representation of the memory 104 of the vehicle 100. The database 109 thus allows reservation data that are intended to be stored or recorded in the memory 104 of the vehicle 100 to be stored. The database 109 has the same storage capacity as the memory 104 of the vehicle 100. When a reservation of the vehicle 100 is added or revoked, the server 107 updates the corresponding records in the database 109 and synchronizes the database 109 with the memory 104 of the vehicle 100. Updates of the database 109 are reflected in the memory 104 of the vehicle 100 via commands to add and/or to delete reservations that are transmitted to the vehicle 100. In one particular embodiment, the commands to add and/or to delete reservations are transmitted to the vehicle via a cellular network. In one particular embodiment, the commands to add and/or to delete allowing the memory 104 of the vehicle 100 to be synchronized with the database 109 are transmitted to the vehicle via the terminal 103, and hence the server 107 initially transmits the update commands to the terminal 103, and subsequently the terminal 103 transmits these commands to the vehicle 100.

Figure 2:
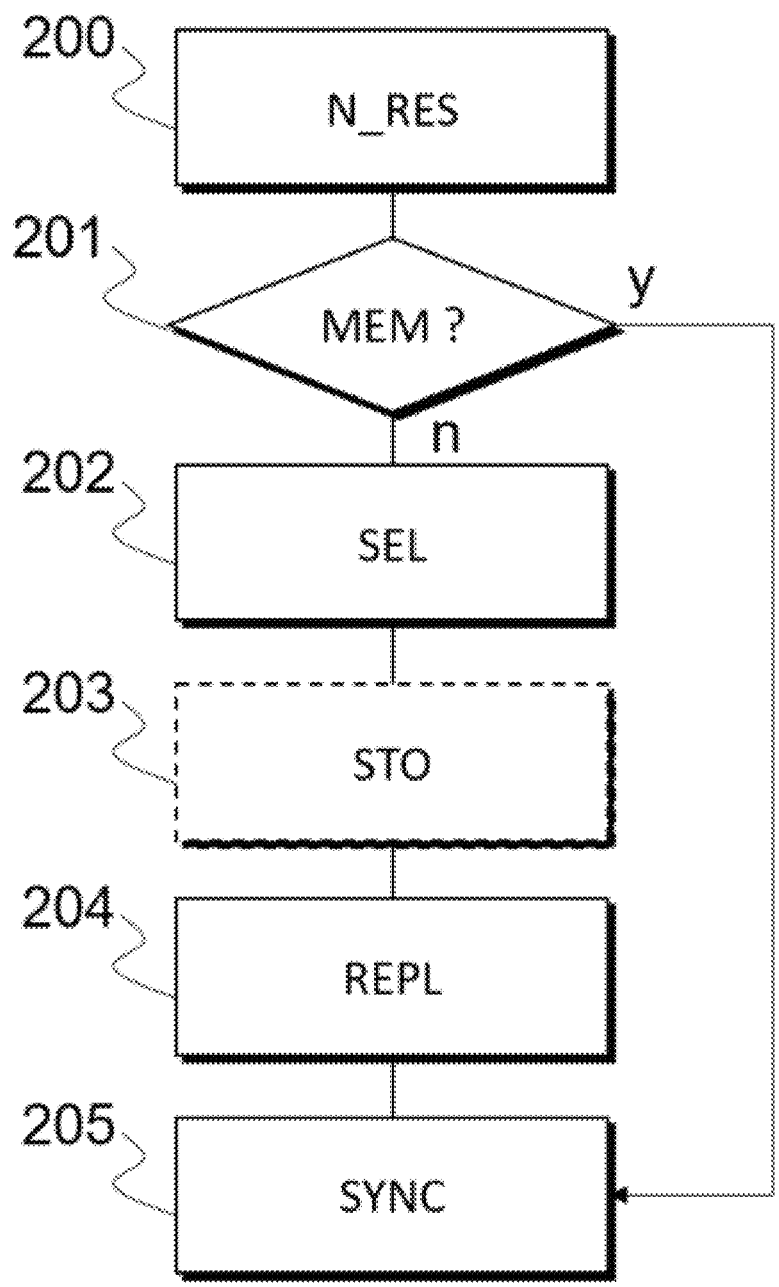
FIG. 2 illustrates the main steps of a managing method according to one particular embodiment.
Figure 3:
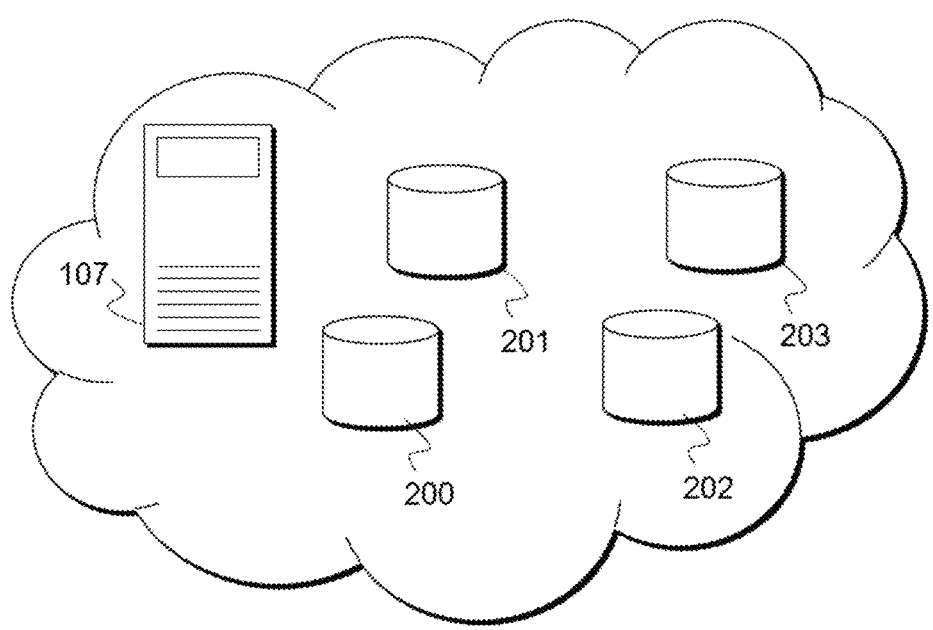
FIG. 3 shows a server environment suitable for implementation of the managing method according to another particular embodiment.

The method for managing authorization will now be described with reference to FIG. 2, in which are shown, in the form of a flowchart, the main steps of a method for managing authorization according to one particular embodiment.

In a first step 200, the server 107 receives a request to reserve the vehicle 100. The vehicle is for example reserved by a user through a website or a mobile application. The reservation received by the server 107 thus comprises at least one identifier of the reserved vehicle 100, a reservation start date and a reservation end date, and an identifier of a mobile terminal 103 of the user who has reserved the vehicle.

More precisely, a reservation comprises two parts. A first part is intended to be stored in the mobile terminal 103. It is a question of a virtual key of the mobile terminal and comprises at least:

a public key of the vehicle 100,
a reservation start date,
a reservation end date.

Optionally, the first reservation datum may further comprise rights to access certain functionalities of the vehicle.

The first reservation datum is signed by a private key of the server to authenticate the source and the integrity thereof.

A reservation also comprises a second part intended to be stored in the memory 104 of the vehicle. It is a question of a virtual key of the vehicle and comprises at least:

a public key of the mobile terminal 103,
a reservation start date,
a reservation end date.

Optionally, the second reservation datum may further comprise rights to access certain functionalities of the vehicle.

The virtual key of the vehicle is signed with the private key of the server 107 to authenticate the source thereof and encrypted with the public key of the vehicle 100. In this way, the virtual key of the vehicle may be communicated to the vehicle via a mobile terminal of a user in a manner that is completely confidential.

In step 201, the server 107 searches, in a local representation of the memory of the vehicle, such as the database 108, for an available location in which the received reservation may be stored. To do this, the server may obtain the number of records contained in the database 108, for example using a suitable SQL query, and compare the number of records thus obtained with a maximum number of reservations that it is possible to store in the memory 104 of the vehicle.

When, at the end of the comparison, it is determined that there are no available locations in which the reservation may be stored, the server 107 implements a step 202 in which it selects, among the reservations stored in the database 108, a reservation the start date of which is after the start date of the obtained new reservation. For example, the server selects the reservation the start date of which is furthest off.

In step 203, the server 107 stores the characteristics of the selected reservation. For example, an identifier of the vehicle in question, a reservation start date and a reservation end date, and an identifier of the mobile terminal associated with the reservation are stored in a waiting list, for example in the database 109, in order that the reservation may be replaced in the database 108 and transmitted to the vehicle before the start of the reservation, when a location becomes available.

In step 204, the server 107 deletes the selected reservation from the database 108, thus freeing up a location in which the new reservation may be stored. The memory 104 of the vehicle is then updated in a step 205, so that its content is synchronized with the content of the database 108.

To do this, in a step 205, the server transmits, to the vehicle, a command to delete the de-prioritized reservation, and a command to add the new reservation. In one particular embodiment, these commands are transmitted directly to the vehicle via a cellular network. According to one particular embodiment, the commands are transmitted to the mobile terminal of one or more users for whom a reservation has been made. The commands are for example transmitted to the terminal 103 with the first reservation data 105. In this way, when the user of the terminal 103 takes possession of the vehicle, the commands will be able to be transmitted to the vehicle and the memory 104 will be able to be updated even should transmission via a cellular network fail.

In one particular embodiment, when a location is freed up in the database 108, the server 107 regenerates a new reservation on the basis of the characteristics of the reservation that were stored in step 203. This regeneration in particular comprises generating a virtual key 105 intended for the mobile terminal and a corresponding virtual key 110 intended for the vehicle. The virtual key of the vehicle may then be stored in the database 108 and transmitted to the vehicle.

In one particular embodiment, the server 107 is provided with three databases 200 to 202.

The first reservation parts, i.e. the virtual keys intended for the mobile terminal 103 of the user, are stored in a database 200.

The second reservation parts, i.e. the virtual keys intended to be stored in the memory 104 of the vehicle, are stored in the database 201.

Lastly, the third database 202 comprises records allowing the link to be made between the virtual keys of the database 200, which virtual keys are intended for the vehicle, and the virtual keys of the database 201, which virtual keys are intended for the mobile terminal.

Figure 4:
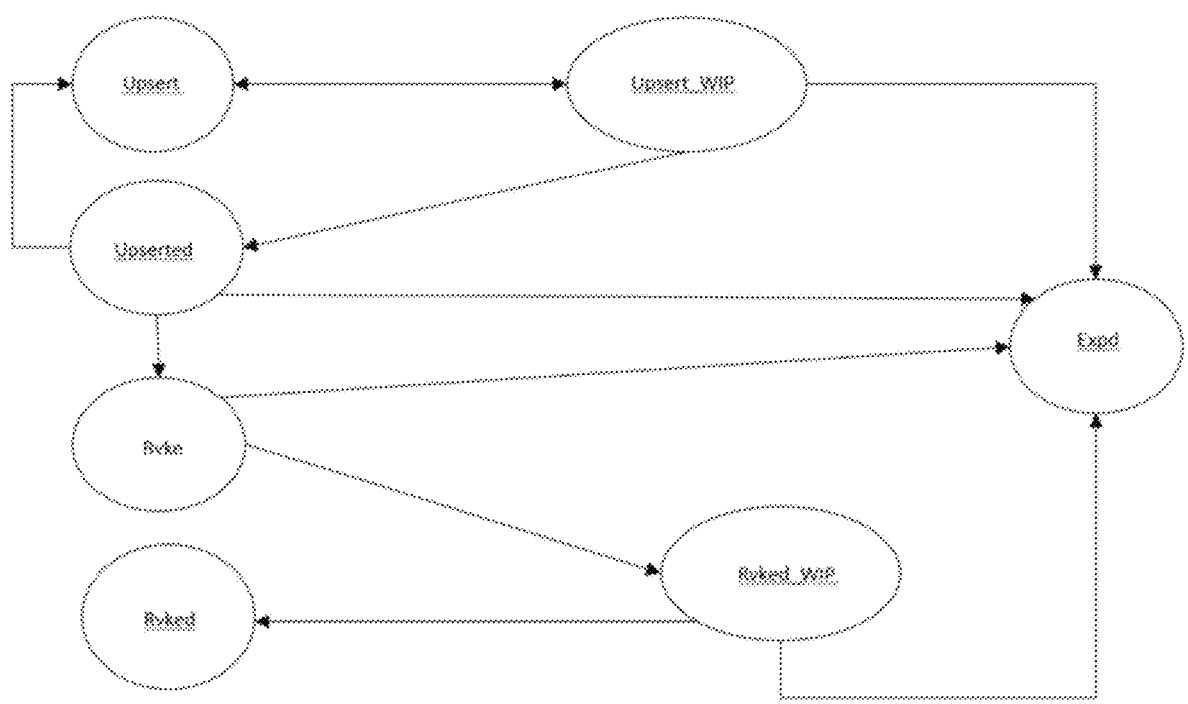
FIG. 4 is a diagram showing states able to be occupied by a reservation.

FIG. 4 shows the various states of a virtual key for a reservation.

When a new reservation is received by the server in step 200, the reservation is in the state "Upsert". The reservation passes to the state "Upsert WIP" when a virtual key has been created for the mobile terminal and when a virtual key has been created for the vehicle. The reservation passes to the state "Upserted" when the vehicle acknowledges correct reception of a virtual key that was transmitted thereto: the automobile indicates that it has received the key. As has been seen, the key may be transmitted either directly to the vehicle via a cellular network, or indeed via a mobile terminal of a user having reserved the vehicle. In this case, the acknowledgement of the vehicle may also be transmitted to the server 107 via a mobile terminal of a user. Reception of such an acknowledgement makes it possible to guarantee that the representation of the memory of the vehicle in the database 21 is indeed representative of the content of the memory 104 of the vehicle.

When a virtual key loaded into the memory 104 of the vehicle is de-prioritized, i.e. replaced by a key of higher priority in steps 202 to 204, the corresponding virtual key returns to the state "Upsert". In other words, the de-prioritized virtual key returns to an initial state and must again be transmitted to the vehicle to return to the state "Upserted" and be able to be used.

The state "Expd" is occupied by a reservation after the reservation end date.

When a user cancels a reservation, the latter passes to the state "Rvke", then "Rvke WIP" when the revocation message is transmitted to the vehicle. The state "Rvked" is occupied when the vehicle acknowledges the revocation message.

Such a state machine makes it possible to guarantee the synchronization between the content of the database 201 and the content of the memory of the vehicle.

The invention claimed is:

1. A method for managing authorization to access a shared vehicle, the vehicle being provided with a memory dimensioned to simultaneously store a maximum number of reservations, the method comprising, which are implemented on reception by a server of a request to reserve the vehicle, the server comprising a local representation of the memory of the vehicle:

obtaining a first reservation of the vehicle, a reservation being associated with at least a reservation start date, a reservation end date and with an identifier of a mobile terminal to be used to access the vehicle; and when the number of reservations stored in the local representation of the memory of the vehicle reaches the maximum number of reservations that it is possible to simultaneously store in the memory of the vehicle:

selecting, from the reservations stored in the local representation of the memory of the vehicle, a second reservation such that the start date of the second reservation is after the start date of the first reservation, replacing, in the local representation of the memory of the vehicle, the second reservation with the first reservation, and transmitting, to the vehicle, a memory synchronization command comprising at least:
a command to delete the second reservation, and
a command to add the first reservation.

2. The method as claimed in claim 1, wherein transmitting the commands to add the first reservation and to delete the second reservation comprises a substep of transmitting said commands to at least one mobile terminal the identifier of which is associated with a reservation stored in the memory associated with the vehicle, the mobile terminal being configured to retransmit said commands via a short-range wireless connection during handover of the vehicle.

3. The method as claimed in claim 1, wherein the characteristics of the second reservation are stored temporarily in the replacing step, and such that it further comprises, when a reservation slot is freed up in the local representation of the memory of the vehicle:
- generating a third reservation comprising the characteristics of the temporarily stored second reservation;
- storing the third reservation in the local representation of the memory of the vehicle; and
- transmitting, to the vehicle, a command to add the third reservation.

4. The method as claimed in claim 1, wherein a reservation comprises at least:
- a first reservation datum intended for the mobile terminal, comprising at least a public key of a mobile terminal, a reservation start date and a reservation end date, and
- a second reservation datum intended for the vehicle, comprising at least a public key of the vehicle, a reservation start date and a reservation end date.

5. A device for managing authorization to access a shared vehicle, the vehicle being provided with a memory dimensioned to simultaneously store a maximum number of reservations, the device comprising a local representation of the memory of the vehicle, a processor, and a memory in which are stored instructions configured to implement the following, when they are executed by the processor:
- obtaining a first reservation of the vehicle, a reservation being associated with at least a reservation start date, a reservation end date and with an identifier of a mobile terminal to be used to access the vehicle;
- when the number of reservations stored in the local representation of the memory of the vehicle reaches the maximum number of reservations that it is possible to simultaneously store in the memory of the vehicle:
  - selecting, from the reservations stored in the local representation of the memory of the vehicle, a second reservation such that the start date of the second reservation is after the start date of the first reservation,
  - replacing, in the local representation of the memory of the vehicle, the second reservation with the first reservation, and
  - transmitting, to the vehicle, a memory synchronization command comprising at least:
    - a command to delete the second reservation, and
    - a command to add the first reservation.

6. A non-transitory data medium containing computer-program instructions that are configured to implement a method for managing access authorization as claimed in claim 1 when the instructions are executed by a processor.

* * * * *